(No Model.)
W. WALTER.
CHURN.
No. 437,537. Patented Sept. 30, 1890.
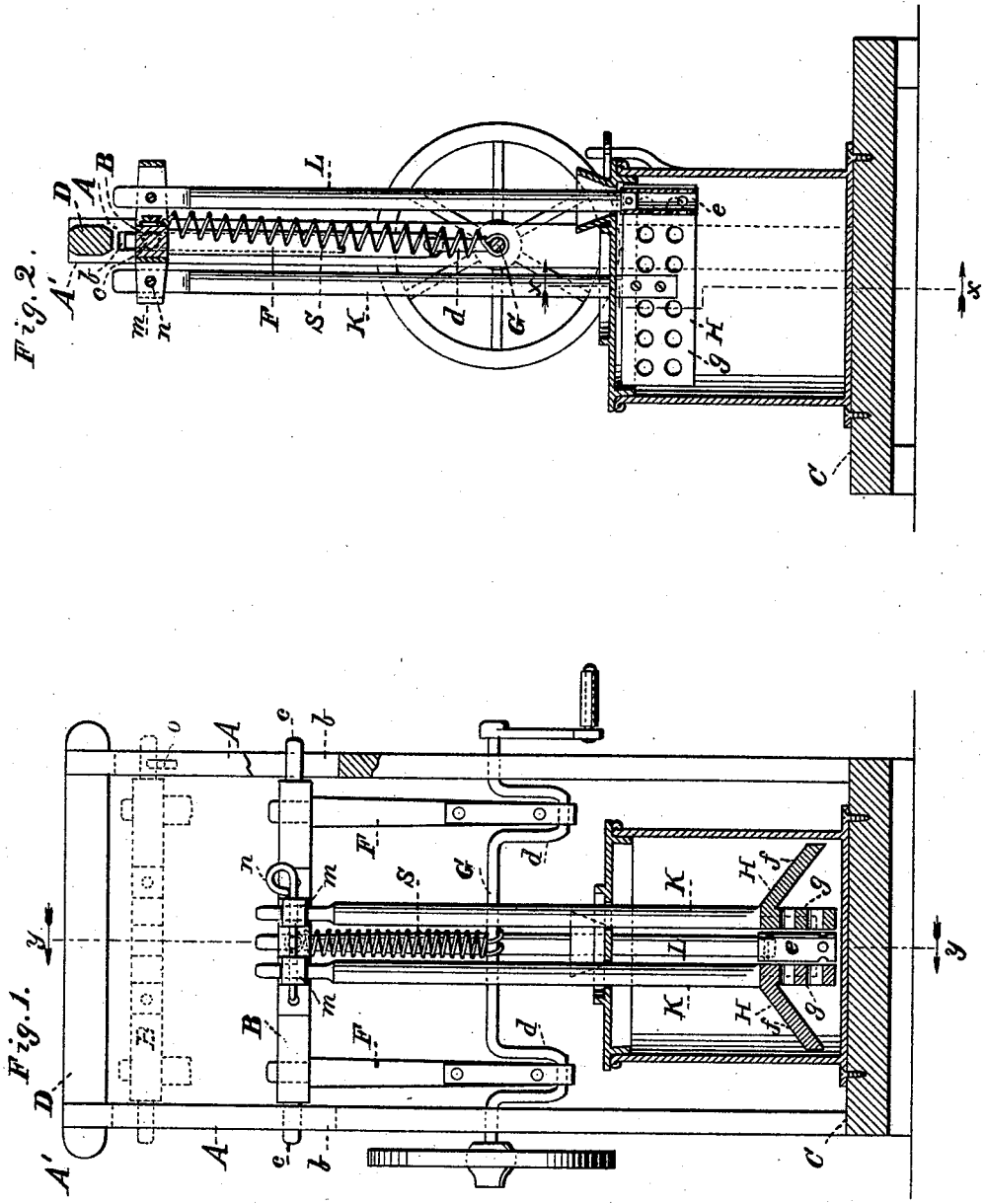
WITNESSES
Villette Anderson,
Philip C. Masi.
INVENTOR
William Walter
by E. W. Anderson
his Attorney

United States Patent Office.

WILLIAM WALTER, OF SALTSBURG, PENNSYLVANIA.

CHURN.

SPECIFICATION forming part of Letters Patent No. 437,537, dated September 30, 1890.

Application filed May 16, 1890. Serial No. 352,086. (No model.)

*To all whom it may concern:*

Be it known that I, WILLIAM WALTER, a citizen of the United States, and a resident of Saltsburg, in the county of Indiana and State of Pennsylvania, have invented certain new and useful Improvements in Churns; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a representation of this invention, and is a section taken where the broken line $x\ x$ is marked on Fig. 2. Fig. 2 is a section taken where the broken line $y\ y$ is marked on Fig. 1.

This invention has relation to churns; and it consists in the novel construction and combination of parts, as hereinafter set forth.

In the accompanying drawings, the letters A A indicate opposite vertical posts of a main frame A', each with slot $b$ at their upper ends supported by the base C and braced at the top by a cross-bar D.

B represents the cross-bar of a vertically-operating frame provided at each end with shouldered projections $c$, which travel in the vertical slots $b$ of the posts A, and having downward-projecting rods F, which engage cranks $d$ (lying in the same plane) of the shaft G, the said shaft being provided at one end with a fly-wheel and at the other end with a crank-handle for actuating the dashers.

The dashers H, which are similar and secured to the dasher-rods K, consist of a semicircular inclined upper plate or flange $f$ and a vertical perforated wall or body portion $g$, the said walls being parallel and opposite each other near the center of the churn. The upper ends of the dasher-rods are perforated laterally, through which perforations they are removably hung in laterally-perforated brackets $m$ on the cross-bar B by a pin $n$.

L is a piston, secured in a manner similar to the dasher-rods on the opposite central side of its cross-bar B, descending into the churn and provided with an air-chamber $e$ at its lower end. This air-chamber is laterally perforated to permit the escape of air, which is carried downward through the milk during the churning process. The air-chamber $e$, which is usually constructed of metal, is always partly filled with air, as the perforations are near its mouth and aids also in breaking the milk.

A vertical, spiral, or other adapted spring S is secured to and between the cross-bar B of the operating-frame and the crank-shaft G by its respective ends, in order to impart a sudden or abrupt downward stroke to the dasher and air-rod.

The peculiar form of the dashers, which slope downward in opposite directions from their vertical perforated walls, adapts them to readily shed the milk during the return-stroke; also, on account of the shelving form of the flanges beneath, the said dashers have a tendency to gather the milk toward the center of the churn, at the same time forcing it through the perforations in the walls of the latter.

The dasher-frame, when operations are suspended, is held up in the main frame by a pin $o$, which enters one of the posts A beneath the cross-bar B. This arrangement is for the purpose of enabling the removal of the dasher-rods and the churn-top.

It will be observed that the cranks of the shaft G lie in the same plane. Consequently although the dasher consists of twin sections their action is simultaneous and uniform during the operation of the churn.

Having described this invention, what I claim, and desire to secure by Letters Patent, is—

In a churn, the combination of the operating-frame comprising the cross-bar B, having shoulder projections traveling in vertical slots of the posts A, the depending rods engaging cranks of the shaft G with the dasher-rods, the spiral spring secured to and interposed between said cross-bar and the crank-shaft, and the piston with its air-chamber, substantially as specified.

In testimony whereof I affix my signature in presence of two witnesses.

WILLIAM WALTER.

Witnesses:
E. R. WALTER,
M. H. RISINGER.